Figure 1:
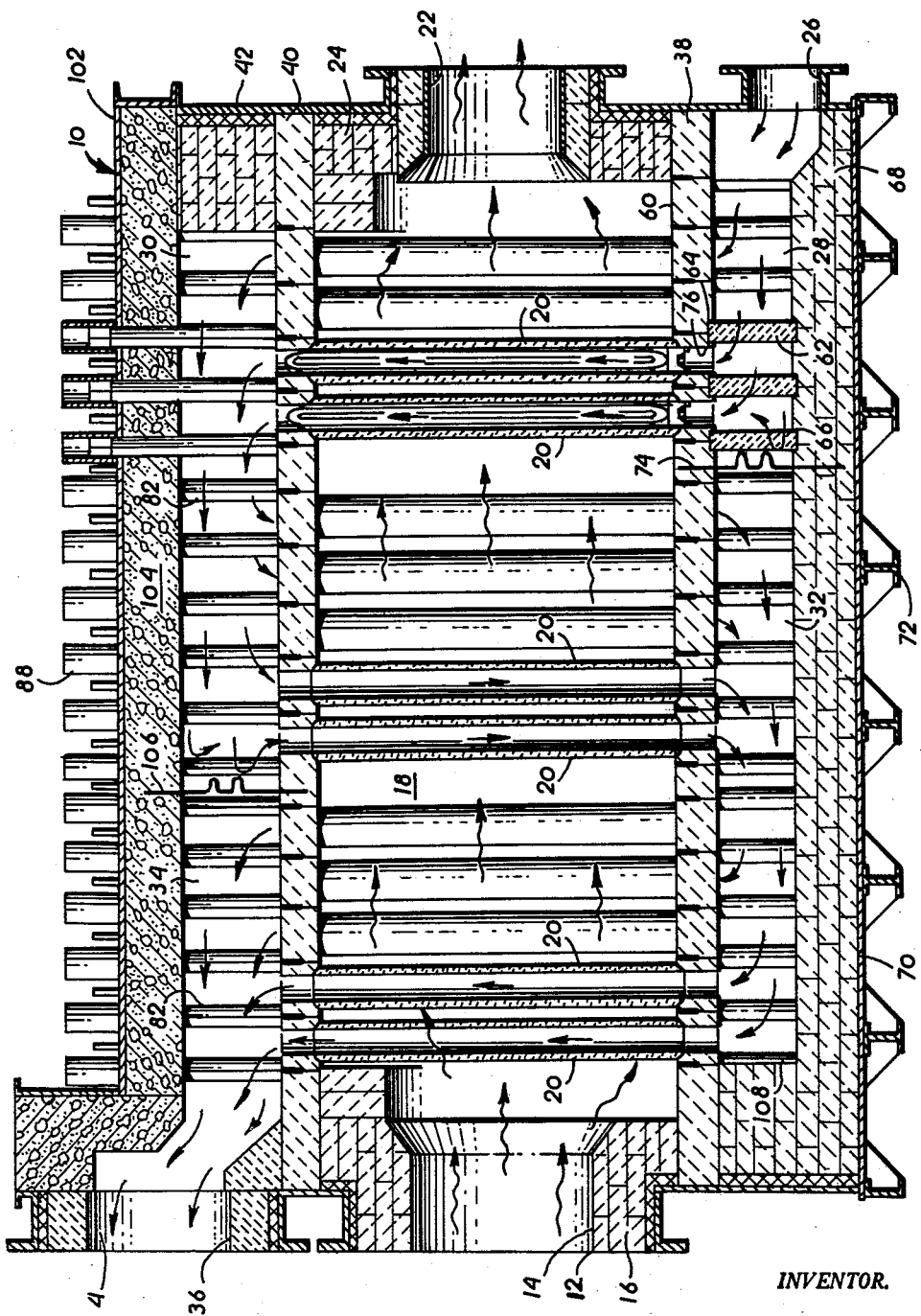

April 21, 1964  K. W. STOOKEY  3,129,931
RECUPERATOR

Filed June 27, 1961  3 Sheets-Sheet 1

INVENTOR.
BY KENNETH W. STOOKEY
Albert L. Jeffers
ATTORNEY

INVENTOR.
KENNETH W. STOOKEY
ATTORNEY

April 21, 1964   K. W. STOOKEY   3,129,931
RECUPERATOR

Filed June 27, 1961   3 Sheets-Sheet 3

INVENTOR.
BY KENNETH W. STOOKEY
Albert L. Jeffers
ATTORNEY

United States Patent Office 3,129,931
Patented Apr. 21, 1964

3,129,931
RECUPERATOR
Kenneth W. Stookey, Markle, Ind.
Filed June 27, 1961, Ser. No. 119,893
7 Claims. (Cl. 263—20)

This invention relates to a recuperator and more particularly to a recuperator for effecting heat exchange between two gaseous media, the one gaseous medium being the heated outlet flow from a furnace and the like and the other medium being an air inlet flow. Recuperators are essential to maintain acceptable efficiency in many furnace operations. The outlet flow of hot gases from a furnace represents a heat loss and if these gases are vented to the atmosphere without abstracting at least a portion of the heat therefrom, operating expenses of the furnace can become exorbitant.

Several advantages derive from usage of a recuperator which is designed to abstract heat from the outflow of gas; for example, where the incoming air is preheated by a recuperator and then fed to the furnace, it has been found that combustion is more efficient and it is possible to operate the furnace efficiently with lower grade fuels which require a high temperature of combustion. Another advantage of preheating incoming air by recuperator operation is that more heat can be released during combustion thereby increasing the heating capacity of a given size heat plant. It is known that preheated air effects more rapid flame propagation and increases the versatility of the heating plant since some processes require increased flame temperatures which are attainable quite conveniently by preheating the air. Recuperator usage has the added advantage of permitting oxidation of the stack gases for the purpose of generating additional heat which can then be utilized by the recuperator for further heating of the incoming air.

The foregoing advantages of recuperator operation can be attained to the greatest degree if the recuperator is capable of sustaining high temperatures over extended periods of time without fracturing or otherwise breaking under thermal stress and maintaining respective fluid tight connections within the recuperator to channel the hot air along one path and the incoming air along a second path so that the two gaseous flows are separated. It can be stated that the present invention is not limited to simply preheating air for supporting combustion; other gases can be used as well where the application is convenient and the present invention is intended to cover all those operations in which heat exchange is effected between two gaseous media.

It is an object of the present invention to provide a recuperator which is composed of substantially all refractory components in order to realize the inherent advantage of refractories as heat resistant materials.

It is a further object of the invention to provide a flexible articulated construction of refractory components which form the recuperator, so that inevitable expansion and contraction of the components can occur without producing damage to the recuperator or impairing the efficiency of the various sealed connections which are essential to adequate recuperator operation.

Another object of the invention is to provide a recuperator design which will operate over extended periods of time without requiring servicing and is capable of operating at temperature levels which are sustainable only by refractory constructions.

The foregoing advantages are realized by providing novel "floating" head wall constructions which provide for expansion and contraction of individual ceramic blocks which form the upper and lower walls of the recuperator so that thermal stresses in the construction materials are either avoided or relieved where they do occur.

Figure 2:
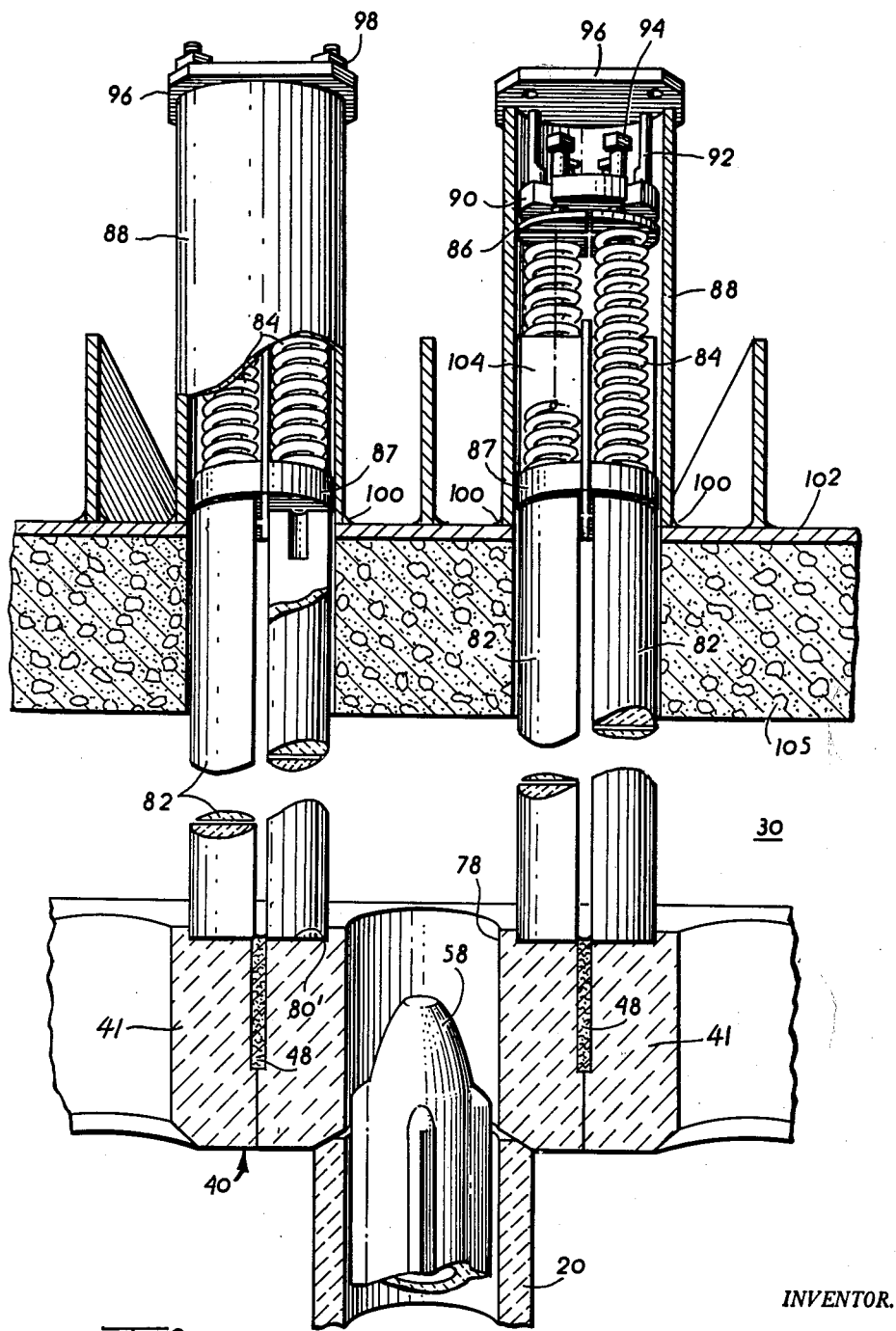
Figure 3:
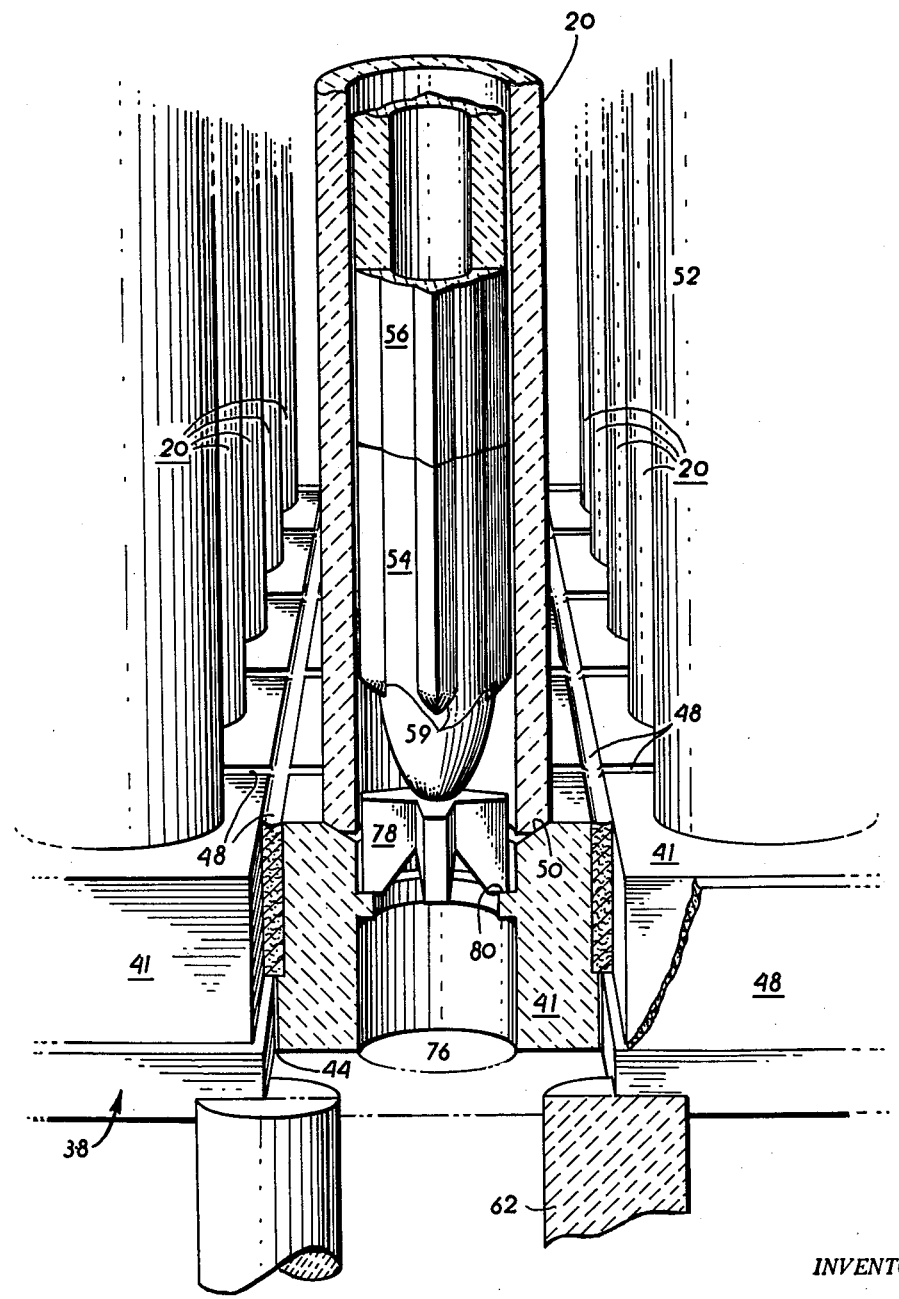

Other objects and features of the invention will become apparent from a consideration of the following description which proceeds with reference to the accompanying drawings wherein:

FIGURE 1 is a longitudinal section view taken through the center of the recuperator and indicating by wavy line arrows and smooth line arrows the flow of hot gas and inlet gas to be preheated, respectively;

FIGURE 2 is an isometric detail view of the biasing means at the upper head wall for maintaining the head blocks and conduits in engagement with each other, a portion of the biasing means being broken away to illustrate details of construction; and, FIGURE 3 is an isometric detail view of the lower head blocks forming the bottom wall of the recuperator, one of the conduits and its associated head block being shown in section to illustrate details of construction.

The recuperator which is designated generally by reference numeral 10 includes an opening 12 which forms an inlet for hot exhaust gases and is connected to the discharge of an industrial furnace or the like (not shown). The incoming gas flow indicated by wavy line arrows passes through passage 14 in portal 16 entering chamber 18 wherein are vertically disposed a number of conduits 20; and, after passing through chamber 18, the gas flow exits through opening 22 of portal 24 and is vented to atmosphere through a chimney or smoke stack (not shown). The incoming flow of air is introduced to the recuperator at inlet opening 26 where it enters compartment 28 following the flow path indicated by the smooth line arrows and then passes upwardly through a bank of conduits 20 opening into compartment 28 and thereby passing across chamber 18 and into compartment 30 which is of larger volume than compartment 28. From compartment 30 the gases are then channeled downwardly through a second bank of conduits 20 connecting with compartment 32 so that air is again brought through chamber 18 and then passes upwardly for a third passage through chamber 18 through a third bank of conduits 20 connecting compartment 32 with compartment 34. From compartment 34 the now heated air leaves the recuperator through exit port opening 36 where it is conducted to the industrial furnace or the like (not shown).

The bottom wall 38 and top wall 40, which define the floor and ceiling of the chamber 18, are composed of a plurality of refractory head blocks 41 which may consist, for example, of double burned clay or other refractory material of greater heat resistance depending upon service requirements. Each head block is separated from its contiguous blocks and from the steel casing 42 defining the side walls of the recuperator by a spacing at each of the four sides thereof, this spacing being in the order of $\frac{1}{16}$ of an inch so that the head block can expand toward and away from its contiguous blocks without effecting thermal stresses which could otherwise produce buckling or fracturing the blocks. This dimension for the spacing is calculatable from the operating temperatures and from the materials selected. From this example dimension and material selected, suitable calculations can be made for appropriate spacings for other materials and other applications.

In addition to the $\frac{1}{16}$ spacing, there is formed along the four sides of each bottom wall block a channel the faces thereof forming the interior surfaces of chamber 18 and provided by complementary recesses in said head blocks 41. The top wall 40 head blocks 41 have their channels formed at the surfaces defining the exterior surface of the chamber. Thus the head blocks are of the same construction throughout the recuperator. The channels formed between the head blocks are filled with a liner 48 of compacted silica-alumina fiber which is merchandised under the trademark "Fiberfrax." The "Fiberfrax" is available through the Refractory Division of Carborundum Company and it is capable of sustaining temperatures in the order of 2300° F. while retaining an excellent resilience permitting expansion of the respective blocks. The "Fiberfrax" can be used as loose fiber or fabricated into rope, cloth or paper and used in any of these forms.

Each conduit 20 has an open end and is tapered to fit within circular recessed seats 50 of head blocks in the lower wall and upper wall respectively and are lapped in and further coated with a luting compound to obtain tight seal where the conduit end is joined with the head block.

At the interior of each conduit 20 is a core 52 which is made up in sections, a lower section 54, intermediate sections 56 and a top section 58, the function of these cores being to define the flow path of the gases through the conduit 20 in accordance with preferred heat exchange parameters. By varying the cross section dimension of the core, it is possible to control air velocities and back pressures within the tube which are control factors in convection heat transfer from the inner conduit wall into the air. The outer wall of the core 52 absorbs radiant heat and adds additional surface area for the transfer of heat to the air. Along the outer surface of the core are spaced longitudinally extending fins 59 which have line contact only with the inner surface of the conduit thereby eliminating breakage of the conduit from "shadowing."

The conduit 20 may be formed from "Carbofrax" which is a silicon carbide material which will withstand the heats required in recuperator operation. The "Carbofrax" tube can sustain temperatures as high as 2500–2600° F.; the material has a high thermal conductivity in the order of ten times that of fire clay and in addition it combines high refractoriness, low permeability and possesses remarkable strength at high operating temperatures to withstand rupturing or crushing. The material also has a high resistance to spalling and corrosion and it is resistant to flame abrasion from combustion products of commercial fuels of high temperature usage (2500–2600° F.).

The bottom wall 38 head blocks 41 of chamber 18 are supported at their four corners by pedestals 62 which fit within quarter round recesses 64 of each bottom wall head block 41 and are seated within circular recesses 66 of refractory liner 68. At the base of lining 68 is a casing bottom plate 70 and support 72.

Compartment 28 which is the first compartment for the incoming air is defined by the exterior surface of bottom wall head 38 blocks 41, refractory lining 68 and partition 74 which separates chamber 28 from chamber 32. Air escapes chamber 28 through passages 76 of bottom wall end blocks 38 and flows past a star-shaped core support 78 (FIGURE 3) resting on annular shoulder 80 formed within passage 76. The air flow upwardly from chamber 28 through conduits 20 to chamber 30 where there is opportunity for mixing of the gas before it enters the intermediate bank of conduits for passage therethrough into chamber 32.

A pressure differential of about one pound square inch exists between compartments 28, 30, 32, 34 and chamber 18, but the gas flows are sealed from each other by the "Fiberfrax" laminations which seal adjoining head blocks and the sealed abutment between conduits 20 and the head blocks 41 at the upper and lower walls 38, 40.

It was previously regarded as unattainable to construct and preserve good sealing connections which would remain gas tight if all refractory components were used, the reason being that expansion and contraction of the ceramic materials inevitably accompany high temperatures which are encountered. In the present invention each conduit is in abutting relation with head blocks at its opposite ends but is not locked with the head blocks so that if differential expansion should occur the conduit will not impose any forces on the head block tending to produce cracking or breakage thereof. The head blocks are therefore free to expand laterally against the adjoining blocks thereof because of the spacing previously described and the blocks are also free to raise or lower independently of the other blocks and without imposing stress between the blocks from such raising or lowering. The non-interlocking connection between the conduits and blocks permits raising and lowering movement of the blocks and conduits together to avoid imposing fracture-producing forces therebetween.

Each upper wall 40 head block 41 has a passage 78 having spacings of about 1/16 inch therebetween and a lamination of "Fiberfrax," the same as provided for the lower wall head blocks 38. At each of the four corners of the upper wall 40 head block 41 is a quarter round recess 80' with a top wall pedestal 82 biased downwardly by a spring 84 which is compressed between a bearing plate 86 (FIGURE 2) and a J-M "Transite" quarter round insulation block 87.

Each head black 41 is biased downwardly to maintain sealing engagement of its associated conduit at the opposite ends thereof with the upper wall head block 40 and lower wall head blocks 38 in the event of longitudinal contraction of the conduit 20. Each set of four springs is disposed within a housing 88 having a thrust plate 90 which is held in place by bolts 92. A plurality of set screws 94 which are threaded into the thrust plate 90 can then be screwed down to bring force against bearing plate 86 and compress springs 84 by a preferred amount. A cover plate 96 is then clamped over the housing by means of nuts 98 to seal off the interior of the casing 88; and, the casing is welded at 100 to the steel shell 102 which encloses the unit. The caged springs 84 are separated and guided by means of spring guides 104 which are received within the casing 88 and are cruciform in cross section to separate the individual springs but allow their free longitudinal movement.

Between the steel shell 102 and compartment 30 is a castable cover lining 105 of ceramic material or the like 104. The upper compartment 30 is thus defined by the exterior surface of the upper wall head blocks 41, and the interior surface of cover lining 105. A barrier 106 prevents communication between compartments 30, 34 and directs the current of air downwardly through the intermediate bank of conduits to compartment 32 where the air is mixed again and then meeting with barrier 108 the air flows upwardly through the final bank of conduits to compartment 34 which connects with outlet 36 leading to the furnace.

In operation, the incoming gas flow from the furnace is introduced through inlet passage 14 at a temperature of as high as 2500° F. and the recuperator is operative at this temperature range which is about 700° higher than prior art recuperators which necessitated a limitation of inlet gas temperatures to a range not in excess of 1800° F. By permitting higher inlet temperatures, it is possible to preheat air beyond the 900° F. which represented the approximate upper limit attainable by prior art recuperators. The preheat possible with the present invention enables the user to obtain higher preheat temperatures for the air thus realizing greater savings. The foregoing is possible because of the use of refractories which are inherently more temperature resistant than metals and the difficulties of cracking or breaking the fluid seals in the unit when the recuperator is cooled are overcome by reason of the floating construction which permits the head blocks to move relatively to each other while maintaining a proper sealing relation with each other and with the conduits 20.

The hot gas inlet flow from the furnace proceeds from inlet 14 traveling in the direction of the wavy line arrows through chamber 18 and exiting through outlet 22 at a much lower temperature when it is passed to the chimney. The inlet air which enters at 26 is received within compartment 28 and is passed upwardly as indicated by the smooth line arrows through conduits 20, flowing transversely to the gas flow and entering compartment 30 where it is mixed and then passed downwardly through a second bank of conduits 20 which interconnect compartment 30 and compartment 32. The air is then passed again transversely through chambers 18, from compartment 32 to compartment 34, where it then exits through outlet 36 connected with the furnace. At each passage of the air through chamber 18 within conduits 20, the air becomes heated and it follows a flow countercurrent to hot gas flow in chamber 18 to obtain maximum heat transfer therebetween. If the recuperator should be shut down and cooled or unevenly heated during operation, then the head blocks 41 forming the upper wall 41 of the recuperator are free to expand both laterally and vertically but without buckling the wall or impairing the seal between the head blocks 41. This is because expansion of one block relatively to the other is permitted by virtue of the spacing and lamination of "Fiberfrax" between the blocks 41. Likewise, the same provision is made for the head blocks 41 forming the lower wall 38 and the vertical "floating" which is permitted each head block by reason of the springs 84, ensures an adequate seal between each conduit 20 at its opposite ends with head blocks 38 and 40, respectively. As a result, free expansion is permitted within the temperature range of operation for the head blocks and for the conduits but without damaging the conduits or head blocks or impairing the seals between the head blocks proper and the head blocks with the conduits.

By disposing the conduits in a vertical position rather than in a horizontal position, there is obtained a more stable structure when heats are encountered which approach the softening point of the bond between the conduits at their opposite ends and their engaging head blocks 41. In operation, the efficiency obtained with the present invention is such that it is possible to reduce by as much as 30% the required recuperator volume and still obtain an equivalent heat exchange operation.

To service the unit, all that is necessary is to remove the steel cover plate 102, and by scratching with the "Fiberfrax" between the head blocks 41 access can be had to the tubes and head blocks. There is no interference from the surrounding head blocks since the spacing between the blocks permits individual removal of the blocks and conduits.

In comparison with prior art recuperators, the investment per unit of heat recovered has been substantially reduced when compared with other refractory recuperators or metal-alloy recuperators; the same factor of improvement is obtained with respect to operating and maintenance expenses.

It will now be evident that the objects of the invention have been achieved by utilizing refractory components which are inherently heat resistant thus permitting high temperature operation and the deficiency of refractory materials has been effectively compensated by novel "floating" construction of the recuperator components. Many of the construction features are obviously a matter of design. For example, the specific number of passes through the hot gas chamber is a matter of engineering design, as are the number of conduits, design of core, etc.

While the present invention has been descibed in connection wtih a single example embodiment, it will be understood that this is illustrative of the invention and in no sense restrictive thereof.

It is anticipated that those skilled in the art can make numerous modifications and revisions of the invention to suit individual design requirements. It is intended that such revisions and variations as incorporate the herein disclosed principles will be included within the scope of the following claims as equivalents of the invention.

What is claimed is:

1. A recuperator including upper and lower intermediate walls forming a chamber for elevated temperature gas from which heat is to be abstracted and including means forming an inlet and means forming an outlet, said upper intermediate wall and a lower intermediate wall each being formed of a plurality of ceramic blocks having spacings and sealing means therebetween providing substantially free expansion of each block toward and away from its contiguous blocks, a plurality of conduits vertically disposed within said chamber and each having sealing engagement at its opposite ends with vertically aligned pairs of said blocks in said upper and lower walls respectively, means defining a plurality of compartments for gas to be heated by the elevated temperature gas and including in part the exterior surfaces of said upper wall and said lower wall, means defining passages extending through said blocks to provide communication from one compartment to the next through said conduits, means forming a barrier to gaseous communication between said compartments except through said conduits whereby said compartments are serially connected for passage of gas from one to the next only by travelling across said heated gas chamber through said conduits, and means for yieldably biasing each of said blocks forming said upper intermediate wall into engagement with its associated conduit to maintain a sealed relationship of said conduits at the opposite ends thereof with their associated blocks during temperature induced dimensional changes of said conduits and blocks.

2. A recuperator including intermediate walls forming a chamber including means forming an inlet for temperature elevated gases and means forming an outlet for releasing said gases after heat is abstracted therefrom, an opposite two of said intermediate walls of said chamber each comprising a plurality of refractory blocks having spacings along each side thereof providing expansion joints between adjacent blocks, means for sealing said expansion joints while providing expansion movement between each block and its adjacent blocks whereby said two opposite intermediate chamber walls are relieved of stresses incident to expansion and contraction thereof, a plurality of conduits each having a sealed abutment connection at its opposite ends with an aligned pair of blocks in said opposite walls whereby each wall is relieved of stress communicable therebetween through said conduits, and means for yieldably biasing said pairs of blocks together urging them into sealed abutment connections at the opposite ends thereof with the associated conduits irrespective of contraction or expansion of said conduits or blocks forming said walls.

3. A recuperator including intermediate walls forming a chamber including means forming an inlet for temperature elevated gases and an outlet for releasing said gases after heat is abstracted therefrom, an opposite two of said intermediate walls of said chamber each including a plurality of refractory blocks having spacings separating them from their adjacent blocks, means for sealing said spacings while providing yielding expansion movement between each block and its adjacent blocks, whereby said two opposite intermediate walls are relieved of stresses incident to expansion and contraction thereof, a plurality of conduits each having a sealed abutment connection at its opposite ends with an aligned pair of blocks in said opposite walls whereby each wall is relieved of stress communicable therebetween through said conduits, means forming passages through each block to provide flow of gas through said conduits for exposure to heat within said chamber conducted through the walls of said conduits, means defining compartments along the external sides of each of said walls formed by said blocks, and means for separating said compartments except for gaseous intercommunication through said conduits, said conduits being arranged to conduct gas from one compartment to the next as a series flow and countercurrently to the flow of temperature-elevated gas through said chamber.

4. A recuperator including upper and lower intermediate walls forming a chamber for elevated temperature gas from which heat is to be abstracted and including means forming an inlet and means forming an outlet, said intermediate upper wall and said intermediate lower wall each formed of a plurality of ceramic head blocks having spacings and sealing means therebetween providing substantially free expansion of each block toward and away from its contiguous blocks, a plurality of conduits vertically disposed within said chamber and each having sealing abutting engagement at its opposite ends with vertically aligned pairs of said head blocks in said upper and lower intermediate walls respectively, a plurality of support members for said ceramic blocks forming said lower intermediate wall and disposed at the exterior surface of said lower intermediate wall, means in conjunction with the exterior surface of said lower intermediate wall forming lower spaced compartments and including means for sealing said lower compartments apart from each other, a plurality of pedestals bearing against the blocks forming said upper wall at the exterior of the surface thereof, means in conjunction with the exterior surface of said upper intermediate wall forming a plurality of upper compartments and including means for sealing said compartments from direct communication therebetween, and means forming an inlet for air which is admitted to one of said compartments and thereafter circulated in series from one compartment to the next through the conduits connected therebetween whereby said air is passed between upper and lower compartments by passage through said conduits and transversely through said chamber.

5. A recuperator including intermediate walls forming a chamber including means forming an inlet for temperature elevated gases and means forming an outlet for releasing said gases after heat is abstracted therefrom, an opposite two of said intermediate walls of said chamber each comprising a plurality of ceramic head blocks and each of said head blocks having spacings separating it from its adjacent blocks, means for sealing said spacings while providing expansion movement between each block and its adjacent blocks, whereby said two opposite intermediate walls are relieved of stresses incident to expansion and contraction thereof, a plurality of conduits including sealed abutment connections at the opposite ends thereof with aligned pairs of head blocks in said opposite intermediate walls whereby each wall is relieved of stress communicable therebetween through said conduits, a plurality of vertically disposed pedestals bearing against the blocks forming one of the intermediate walls of said chamber, spring means bearing against said pedestals to effect biasing of said pedestals toward their associated blocks and forming sealing engagement connections between each conduit at its opposite ends with its associated head blocks, and means for compressing said springs to maintain biasing effort on each of the blocks forming said one intermediate wall whereby allowance for expansion and contraction of said conduits and blocks is provided while sealing relation therebetween is maintained.

6. A recuperator including intermediate walls forming a chamber provided with means forming an inlet and means forming an outlet for heated gases from which heat is abstracted during passage through said chamber, the upper intermediate wall and the lower intermediate wall of said chamber composed of a plurality of refractory head blocks each separated from its contiguous blocks and including a sealing agent therebetween providing substantially free expansion of the respective blocks toward and away from each other, means defining a plurality of compartments separated one from the other disposed in said chamber, means forming a further inlet for admitting air to one of said compartments, connecting means including conduits between said compartments for circulating said air therethrough, means forming recessed seats within vertically aligned pairs of blocks in said upper and lower wall to receive the opposite ends of said conduits, said conduits being disposed in spaced vertical relation with respect to said chamber, means defining passages extending through each of said blocks to provide passage of air from one compartment to the next of said plurality of compartments through said conduits, means for yieldably biasing each of the blocks forming said upper intermediate wall into engagement with its associated conduit to maintain a sealing abutting relation between each conduit and said head blocks at the opposite ends thereof regardless of temperature induced dimensional changes of said head blocks and conduits.

7. A recuperator including intermediate walls forming a chamber with the upper intermediate wall and lower intermediate wall of said chamber each being composed of a plurality of ceramic blocks each separated from its contiguous blocks and including a sealing agent therebetween providing substantially free expansion of the respective blocks toward and away from each other, a plurality of compartments separated one from the other and disposed in said chamber, one of said compartments having means forming an inlet for admitting air, conduits connecting said compartments in series for circulating said air through said compartments, a core disposed within each of said conduits, each of said cores including projections which engage the inner wall of said conduit to provide an annular passage between said conduit and core through which air is transmitted from one compartment to the next, means forming recessed seats within vertically aligned pairs of blocks in said upper and lower intermediate walls to receive the opposite ends of said conduits therein to dispose said conduits in spaced vertical relation within said outlet chamber, means defining passages extending through each of said blocks to provide flow of air from one compartment to the next through said conduits, and means for yieldably biasing each of the blocks forming said upper intermediate wall into engagement with its associated conduit to maintain sealing relation between said conduits and said blocks at the opposite ends thereof regardless of temperature induced dimensional changes of said blocks and conduits.

References Cited in the file of this patent

UNITED STATES PATENTS

| | | |
|---|---|---|
| 1,936,003 | White | Nov. 21, 1933 |
| 2,095,643 | Lehr | Oct. 12, 1937 |
| 2,507,662 | Cripps | May 16, 1950 |
| 2,530,958 | Greene | Nov. 21, 1950 |
| 2,653,799 | Stahn et al. | Sept. 29, 1953 |